United States Patent
Capoglu et al.

(10) Patent No.: US 10,975,684 B2
(45) Date of Patent: Apr. 13, 2021

(54) ACTIVE GAP SUB

(71) Applicant: Halliburton Energy Services, Inc., Houston, TX (US)

(72) Inventors: Ilker R. Capoglu, Houston, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/333,318

(22) PCT Filed: Jan. 30, 2017

(86) PCT No.: PCT/US2017/015628
§ 371 (c)(1),
(2) Date: Mar. 14, 2019

(87) PCT Pub. No.: WO2018/140056
PCT Pub. Date: Aug. 2, 2018

(65) Prior Publication Data
US 2019/0338632 A1 Nov. 7, 2019

(51) Int. Cl.
*G01V 3/30* (2006.01)
*E21B 47/0228* (2012.01)
*E21B 47/13* (2012.01)

(52) U.S. Cl.
CPC .......... *E21B 47/0228* (2020.05); *E21B 47/13* (2020.05); *G01V 3/30* (2013.01)

(58) Field of Classification Search
CPC .............. E21B 17/003; E21B 47/0228; E21B 47/02216; E21B 47/09; E21B 7/04; E21B 47/13; G01V 3/18; G01V 3/30
See application file for complete search history.

(56) References Cited

U.S. PATENT DOCUMENTS

| | | |
|---|---|---|
| 6,680,613 B2 | 1/2004 | Rosthal et al. |
| 6,710,601 B2 | 3/2004 | Rosthal et al. |
| (Continued) | | |

FOREIGN PATENT DOCUMENTS

WO    2015172251    11/2015

OTHER PUBLICATIONS

ISRWO International Search Report and Written Opinion for PCT/US2017/015628 dated Oct. 25, 2017.

(Continued)

*Primary Examiner* — Vinh P Nguyen
(74) *Attorney, Agent, or Firm* — Benjamin Ford; C. Tumey Law Group PLLC

(57) ABSTRACT

A method and system for mitigating direct coupling. A method of mitigating direct coupling may comprise disposing an electromagnetic sensor system in a wellbore. The electromagnetic sensor system may include a receiver disposed on a conductive body and a gap sub disposed at another location on the conductive body. Exciting an electromagnetic source to inject an electrical current into a formation. Exciting the gap sub to achieve a small current condition at the selected point. Performing a first measurement at a receiver. Interpreting the first measurement to calculate a formation or pipe parameter and using the formation or pipe parameter to adjust at least one parameter of a well operation. A system of mitigating direct coupling may include a conductive body may comprise a gap sub, a controller, a voltage source, a receiver, and an information handling system. The information handling system may be operable to cancel current.

18 Claims, 7 Drawing Sheets

(56) References Cited

U.S. PATENT DOCUMENTS

| | | |
|---|---|---|
| 6,926,098 B2 | 8/2005 | Peter |
| 7,138,897 B2 | 11/2006 | Minerbo et al. |
| 7,812,610 B2 | 10/2010 | Clark et al. |
| 8,154,420 B2 | 4/2012 | Petrovic et al. |
| 8,917,094 B2 * | 12/2014 | Bittar .................. G01V 3/26 324/339 |
| 9,000,940 B2 | 4/2015 | Chau et al. |
| 9,069,097 B2 | 6/2015 | Zhang et al. |
| 2009/0030615 A1 | 1/2009 | Clark |
| 2009/0066334 A1 | 3/2009 | Peter |
| 2011/0309836 A1 | 12/2011 | Bittar et al. |
| 2012/0085583 A1 | 4/2012 | Logan et al. |
| 2015/0101867 A1 * | 4/2015 | Clark .................. G01V 3/24 175/50 |
| 2015/0268371 A1 | 9/2015 | Donderici et al. |
| 2016/0017706 A1 | 1/2016 | Liu et al. |
| 2018/0313211 A1 * | 11/2018 | Pan .................. E21B 41/0085 |

OTHER PUBLICATIONS

Extended European Search Report for PCT/US2017/015628 dated Nov. 7, 2019.

\* cited by examiner

ACTIVE GAP SUB

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") operation, wherein the second wellbore may be an injection wellbore while the target wellbore may be a production wellbore. Yet another application may be where knowledge of the target wellbore's location may be needed to avoid collision during drilling of the second wellbore.

Electromagnetic ranging tools disposed on a conductive body may be employed in subterranean operations to determine direction and distance between two wellbores. Electromagnetic ranging tools may use different techniques to obtain current on a conductive member in the target wellbore. Without limitation, approaches may include directly injecting a current into the conductive member and/or inducing a current on a conductive member by transmitting electromagnetic fields by coil antennas positioned in a second wellbore. The injection of current from the electromagnetic ranging tools may induce a current along the conductive body, which may create a direct signal. The direct signal may be sensed and recorded by a receiver disposed on the conductive body. Recording the direct signal may hinder and/or overshadow secondary signals recorded from a formation and/or target wellbore. Gap subs may be implemented to prevent the propagation of direct signals along the conductive body. Specifically, gap subs may prevent current from flowing through a section of the conductive body. In examples, controls may be implemented to control the movement of voltage and/or current through the gap sub, which may allow an operator to cancel out current at any position along the conductive body.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
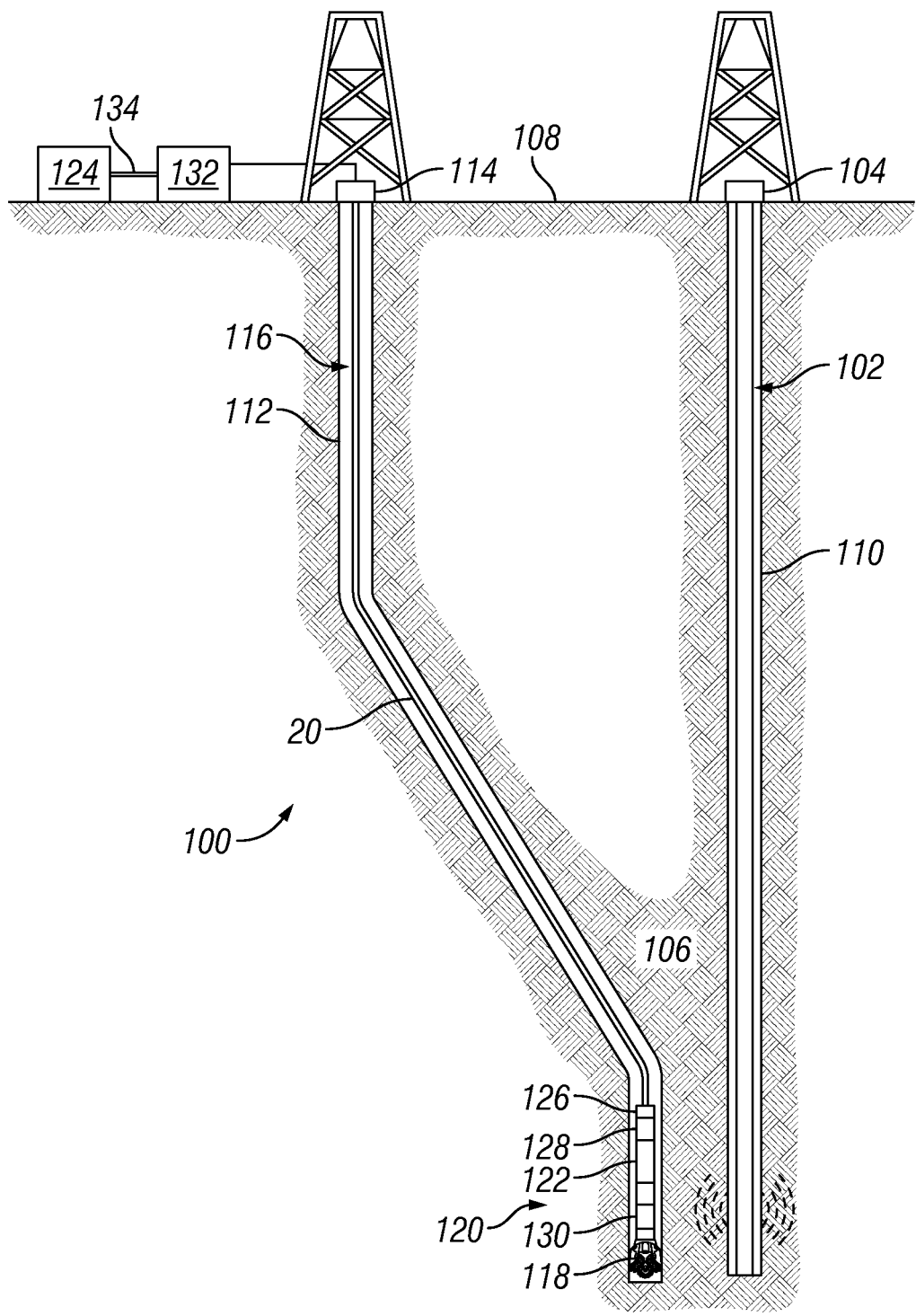
FIG. 1 is a schematic illustration of an example of an electromagnetic sensor system in a wellbore.

This disclosure relates generally to an electromagnetic sensor systems in wellbore operations, such as measuring-while-drilling (MWD), logging-while-drilling (LWD), wireline logging, and permanent monitoring operations. Specifically, this disclosure relates to the mitigation of undesired direct coupling between an electromagnetic source and a receiver in an electromagnetic sensor system. This coupling may be a result of conduction currents created on a conductive body 120 which may be metallic by the excitation of the electromagnetic source. In examples, without limitation, tubulars may be disposed within the drill collar on conductive body 120, a wireline tool mandrel, and/or permanently installed production casing. For brevity, the metallic tubular will be referred to as conductive body 120 below. The receiver in the electromagnetic sensor system may be a magnetometer and/or an induction coil, which may reside on conductive body 120 and/or outside. Similarly, where used, either electrode (source and return) may reside on conductive body 120 and/or outside, even on the surface.

In certain types of electromagnetic sensor systems, electrical current may be injected into the formation via an electromagnetic source in the form of an electrode pair for logging, ranging, monitoring, and/or measurement purposes, among others. When these sensor systems are used, a significant current density may form on the metallic body of the conductive body 120, as current may prefer highly conductive paths over less conductive ones. The receiver may be a device that senses magnetic fields (such as a magnetometer or an induction coil). The conductive body current near the receiver may create a large coupling signal. This signal (referred to as "direct signal") may be undesired, as it may overshadow the desired signal from the formation and require a large dynamic range. In examples, there may be many different techniques for eliminating or mitigating the direct signal. One technique is to place an insulating gap sub near the receiver. This may limit the axial current strength in the neighborhood of the receiver and may also reduce the direct signal. However, unless the gap sub may be disposed at the receiver, current cancellation may not occur at the receiver. The present disclosure describes methods for shifting current cancellation at the gap sub to the receiver location. This may be done by applying a certain voltage (referred to as "gap voltage") between the two sides of the gap sub.

An electromagnetic sensor system may comprise an electromagnetic ranging tool, which may comprise an information handling system, a toroid, a transmitter and/or receiver. The transmitter and/or receiver may include toroids, coils and/or electrodes. Transmission of electromagnetic fields by the transmitter and the recordation of signals by the receiver, may be controlled by an information handling system.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic sensor system 100. Specifically, FIG. 1 shows an electromagnetic sensor system 100 for ranging. As illustrated, a target wellbore 102 may extend from a first wellhead 104 into a subterranean formation 106 from a surface 108. Generally, target wellbore 102 may include horizontal, vertical, slanted, curved, and other types of wellbore geometries and orientations Target wellbore 102 may be cased or uncased. A conductive member 110 may be disposed within target wellbore 102 and may comprise a metallic material that may be conductive and magnetic. By way of example, conductive and magnetic member 110 may be a casing, liner, tubing, or other elongated steel tubular disposed in target wellbore 102. Determining the position and direction of target wellbore 102 accurately and efficiently may be required in a variety of applications. For example, target wellbore 4 may be a "blowout" well. Target wellbore 102 may need to be intersected precisely by a second wellbore 112 in order to stop the "blowout." Alternatively, it may be desired to avoid collision with target wellbore 102 in drilling second wellbore 112 or it may be desired to drill the second wellbore parallel to the target wellbore 102, for example, in SAGD applications. In examples, target wellbore 102 may not be accessible and/or information about the position and structure of target wellbore 102 may not be available. Electromagnetic sensor system 100 may be used for determining the location of target wellbore 4 with respect to second wellbore 112.

With continued reference to FIG. 1, second wellbore 112 may also extend from a second wellhead 114 that extends into subterranean formation 106 from surface 108. Generally, second wellbore 112 may include horizontal, vertical, slanted, curved, and other types of wellbore geometries and orientations. Additionally, while target wellbore 102 and second wellbore 112 are illustrated as being land-based, it should be understood that the present techniques may also be applicable in offshore applications. Second wellbore 112 may be cased or uncased. In examples, a drill string 116 may begin at second wellhead 114 and traverse second wellbore 112. A drill bit 118 may be attached to a distal end of drill string 116 and may be driven, for example, either by a downhole motor and/or via rotation of drill string 116 from surface 108. Drill bit 118 may be a part of conductive body 120 at distal end of drill string 116. While not illustrated, conductive body 120 may further comprise one or more of a mud motor, power module, steering module, telemetry subassembly, and/or other sensors and instrumentation as will be appreciated by those of ordinary skill in the art. As will be appreciated by those of ordinary skill in the art, conductive body 120 may be a measurement-while drilling (MWD) or logging-while-drilling (LWD) system.

Without limitation, electromagnetic sensor system 100 may comprise an electromagnetic ranging tool 122. While FIG. 1 illustrates use of electromagnetic ranging tool 122 on drill string 116, it should be understood that electromagnetic ranging tool 122 may be alternatively used on a wireline. Electromagnetic ranging tool 122 may be a part of conductive body 120. Electromagnetic ranging tool 122 may be used for determining the distance and direction to target wellbore 102. Additionally, electromagnetic ranging tool 122 may be connected to and/or controlled by information handling system 124, which may be disposed on surface 108. In examples, information handling system 124 may communicate with electromagnetic ranging tool 122 through a communication line (not illustrated) disposed in (or on) drill string 118. In examples, wireless communication may be used to transmit information back and forth between information handling system 124 and electromagnetic ranging tool 122. Information handling system 124 may transmit information to electromagnetic ranging tool 122 and may receive as well as process information recorded by electromagnetic ranging tool 122. In addition, electromagnetic ranging tool 122 may include a downhole information handling system 126, which may also be disposed on conductive body 120. Downhole information handling system 126 may include, without limitation, a microprocessor or other suitable circuitry, for estimating, receiving and processing signals received by the electromagnetic ranging tool 122. Downhole information handling system 126 may further include additional components, such as memory, input/output devices, interfaces, and the like. While not illustrated, the electromagnetic ranging tool 122 may include one or more additional components, such as analog-to-digital converter, filter and amplifier, among others, that may be used to process the measurements of the electromagnetic ranging tool 122 before they may be transmitted to surface 108. Alternatively, raw measurements from electromagnetic ranging tool 122 may be transmitted to surface 108.

In examples, electromagnetic ranging tool 122 may comprise an electromagnetic source 128 and/or a receiver 130. It should be noted that electromagnetic ranging tool 122 may comprise a plurality of electromagnetic sources 128 and/or a plurality of receivers 130. The plurality of electromagnetic sources 128 and the plurality of receivers 130 may be disposed along a longitudinal axis of the electromagnetic ranging tool 122. The plurality of electromagnetic sources 128 may include a magnetic source, such as a magnet assembly (containing permanent and/or electro-magnets), capable of inducing a magnetization in conductive and magnetic member 110 disposed in target wellbore 102.

Any suitable technique may be used for transmitting signals from electromagnetic ranging tool 122 to surface 108, including, but not limited to, wired pipe telemetry, mud-pulse telemetry, acoustic telemetry, and electromagnetic telemetry. While not illustrated, conductive body 120 may include a telemetry subassembly that may transmit telemetry data to the surface. Without limitation, a transmitter in the telemetry subassembly may be operable to generate pressure pulses in the drilling fluid that propagate along the fluid stream to surface 108. At surface 108, pressure transducers (not shown) may convert the pressure signal into electrical signals for a digitizer 132. Digitizer 132 may supply a digital form of the telemetry signals to information handling system 124 via a communication link 134, which may be a wired or wireless link. The telemetry data may be analyzed and processed by information handling system 124. For example, the telemetry data could be processed to determine location of target wellbore 102. With the location of target wellbore 102, a driller could control the conductive body 120 while drilling second wellbore 112 to intentionally intersect target wellbore 102, avoid target wellbore 102, and/or drill second wellbore 112 in a path parallel to target wellbore 102.

Figure 2:
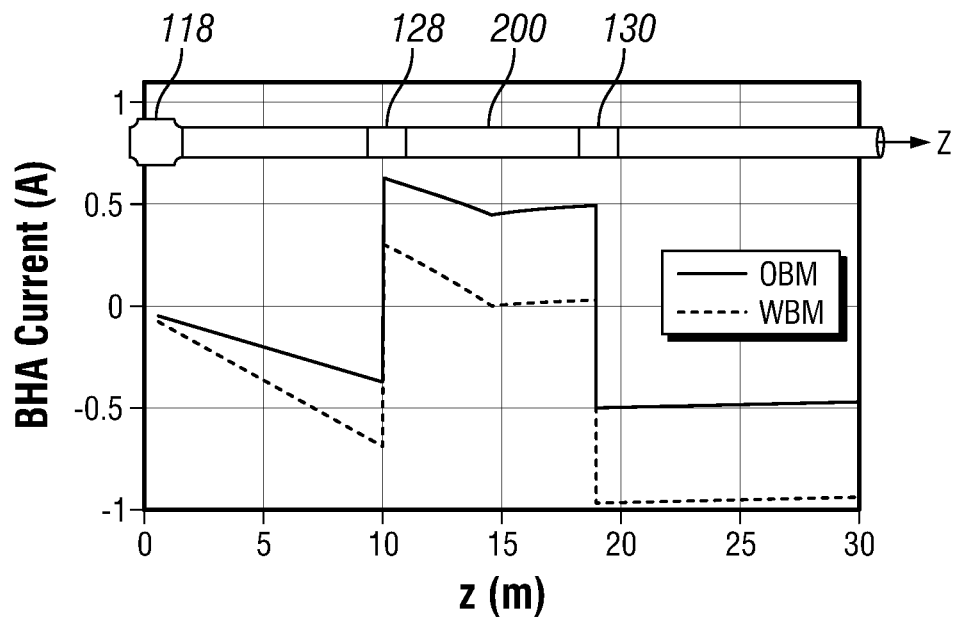
FIG. 2 illustrates a chart depicting cancelling current along a conductive body 120.

Conductive body 120 may operate to inject electrical current through electromagnetic source 128 into formation 106 for logging, ranging, monitoring, and/or measurement purposes. During operation, a significant current density may form on the metallic body of conductive body 120, as current prefers highly-conductive paths over less conductive ones. FIG. 2 illustrates an example of current flow on conductive body 120 between electromagnetic source 128 and receiver 130, wherein a gap sub 200 may be disposed between electromagnetic source 128 and receiver 130. Gap sub 200 may be a short joint of pipe within drill string 116 with threaded ends that may be attached to other pipes within drill string 116. The portion of gap sub 200 that attaches to other pipes within drill string 116 may be made of an insulating material which may prevent current from flowing through the body of gap sub 200. Without limitation, electromagnetic source 128 and receiver 130 may be placed thirty feet apart on conductive body 120, and a three inch gap sub 200, shown on FIG. 1 but may be a different length in other examples, may be disposed between electromagnetic source 128 and receiver 130 to prevent shorting. Formation resistivity may be about twenty ohms. Drilling mud may be flowing in the annular region between conductive body 120 and a borehole wall. In FIG. 2, both oil based mud, with a resistivity of about 1000 ohms, and water based mud, with a resistivity of about 0.5 ohms may be considered. Without limitation, conductive body 120 may be about 2000 meters long, with about thirty meters illustrated in FIG. 2 for clarity. The two lines in the plot represent the +z-directed conductive body current for water based mud and oil based mud. As illustrated, conductive body current may change at electromagnetic source 128 and receiver 130. For example, current may be flowing in the −z direction on the left side of electromagnetic source 128, while it may be in the +z direction on its right side. The conductive body current may be suppressed at gap sub 200 between electromagnetic source 128 and receiver 130, more efficiently with oil based mud than with water based mud. Current may be stronger on either side of electromagnetic source 128 or receiver 130, regardless of the mud type. Receiver 130 may be a device that senses magnetic field (such as a magnetometer and/or an induction coil), conductive body 120 near receiver 130 may cause a coupling effect, which may be recorded as a direct signal. This direct signal may not be desired, as it may overshadow signals recorded from formation 106 and may require a large dynamic range.

Figure 3:
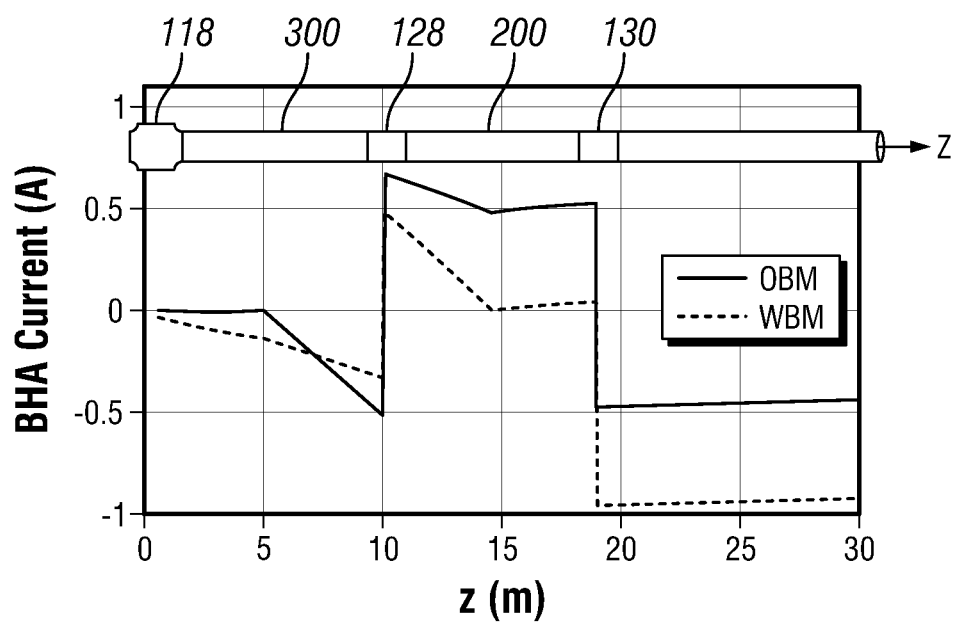
FIG. 3 illustrates another chart depicting cancelling current along a conductive body 120.
Figure 4:
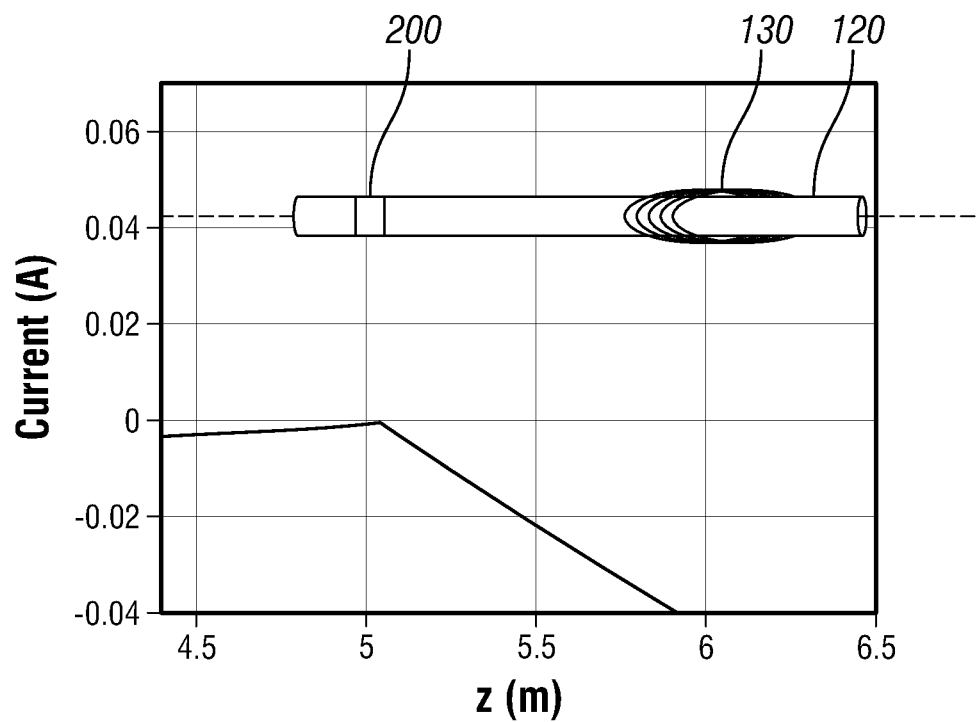
FIG. 4 illustrates a chart depicting cancelling current at a gap sub in relation to a receiver.
Figure 5:
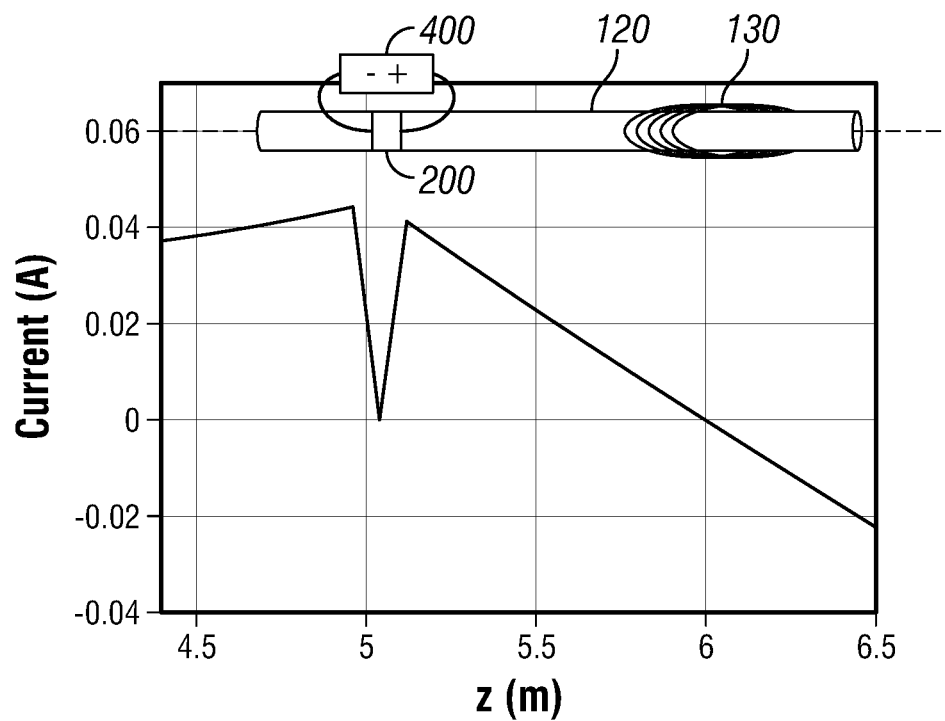
FIG. 5 illustrates another chart depicting cancelling current at a gap sub in relation to a receiver.

In examples, a system and method for limiting axial current may be to dispose gap sub 200 in proximity to receiver 130. This may limit the axial current strength in the surrounding area of receiver 130 and reduce the direct signal. For example, a gap sub 200 may be disposed substantially close to receiver 130, wherein substantially close is defined as about one foot to about twenty feet from receiver 130. As axial current flows along conductive body 120 from electromagnetic ranging tool 122, it may come into contact with receiver 130, which may interfere, corrode, and/or mask additional signals that may be recorded by receiver 130. A gap sub 200 and/or a second gap sub 300 may be placed between electromagnetic ranging tool 122 and receiver 130, which may prevent and/or dampen axial current. FIGS. 3 through 5 illustrate specific examples of gap sub 200 and second gap sub 300 disposed on conductive body 120 to prevent and/or dampen axial current. A second gap sub 300, as illustrated in FIG. 3, may be placed at five meters from drill bit 118, which may be disposed between drill bit 118 and electromagnetic source 128, which is illustrated in FIG. 3. Conductive body 120 may be suppressed at second gap sub 300. Suppression of conductive body 120 may be better with oil based mud. In examples, gap sub 200 may be collocated with receiver 130. In other examples, receiver 130 may be at a certain distance from gap sub 200 in the axial direction along conductive body 120. An example of this is shown in FIG. 4, where receiver 130 may be disposed one meter away from gap sub 200. In this example, an average current of 0.04 Amps may flow through conductive body 120 near receiver 130. FIG. 4 illustrates the cancellation of current at gap sub 200 and that current may still be measured at receiver 130.

A system and method for shifting current cancellation at gap sub 200 to receiver 130 or another location disposed on electromagnetic ranging tool 122 may be employed to achieve small current condition. Small current condition is defined herein as current at about less than 5% of the maximum current flowing on the surface on the conductive body 120. This may be done by applying a "gap voltage" between a first end and a second end to gap sub 200. In examples, oil based mud may have a high resistivity, which may cause gap voltage to be less sensitive to formation resistivity. In examples, water based mud may require gap voltage to be found by several methods. For example, if the formation resistivity may be available through other means (LWD, wireline logging, etc.), the gap voltage may be computed by solving a numerical conduction model for conductive body 120. Alternatively, gap voltage may be calibrated on surface 108 by using lumped circuit models for different formation resistivities. If the formation resistivity may not be available, the current at receiver 130 may be measured as a first measurement using a toroid coil, not illustrated, in the downhole environment and fed back into the circuitry for determining the optimum gap voltage. The first measurement form receiver 130 may be interpreted to be used for calculating formation and/or pipe parameters. The formation and/or pipe parameters may be used to adjust at least one parameter within well operations. A second measurement may further be taken at receiver 130. The first measurement and the second measurement may be taken at different times or different frequencies. The first measurement and second measurement may be performed by a first set of source and gap sub currents or a second set of source and gap sub currents. The first set of source and gap sub currents and the second set of source and gap sub currents may be linearly independent. The first measurement and the second measurement may be combined into combined measurements to achieve the small current condition.

FIG. 5 illustrates a gap sub 200 with gap voltage applied to gap sub 200. Without limitation, cancellation of conductive body current may occur at the center of receiver 130, around six meters from the drill bit (not illustrated). The current flow in the two sides of gap sub 200 may be reversed due to gap voltage. A voltage source 500 is illustrated outside conductive body 120 for visual clarity. In examples, voltage source 400 may be disposed in electronics (not illustrated) on conductive body 120, conductive body 120, and/or gap sub 200. Electrical parameters of gap sub 200 are listed in Table 1 below. There may be a natural voltage of 1.606 V across the terminals of a passive gap (traditional gap with no active voltage applied to its terminals). In examples, the gap current may be zero with no active source. The electrode voltage may be 1.816 V, and current cancellation may be found at gap sub 200. If a gap voltage of Vg=1.997 V is applied, a counter-current of 46 mA may be generated at gap sub terminals and current cancellation may shift along conductive body 120. In order to maintain an electrode current of 1 A, the electrode voltage may be increased slightly to 1.89 V.

TABLE 1

| | Gap Voltage (V) | Gap Current (mA) | Location of Null (m) | Electrode Voltage (V) | Electrode Current (I) |
|---|---|---|---|---|---|
| Passive Gap | 1.606 | 0 | 5 | 1.816 | 1 |
| Active Gap | 1.997 | 46 | 6 | 1.890 | 1 |

The voltage and current values in Table 1 may be achieved with standard downhole electronics. The difference between the natural gap voltage (1.606 V) and the active gap voltage (1.997) may be stable and consume a reasonable amount of power.

Figure 6:
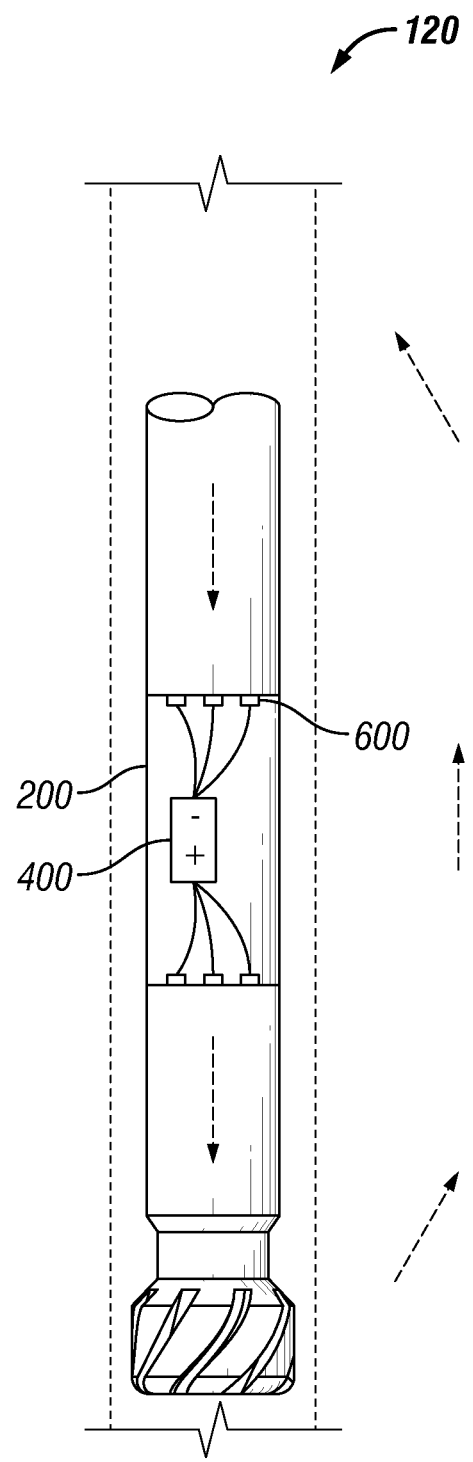
FIG. 6 is a schematic illustration of an example of a conductive body 120.

FIG. 6 illustrates a gap sub 200 disposed on conductive body 120. Gap sub 200 may prevent current flow along conductive body 120. It is to be understood that gap sub 200 may be disposed on a drill collar, a wireline tool mandrel, and/or a casing. Gap sub 200 may comprise a voltage source 400, which may maintain a voltage $V_g$ between two ends of gap sub 200. In examples, voltage source 400 may be disposed on conductive body 120 at a distance from gap sub 200. Additionally, connection ports 600 may be utilized at each end of gap sub 200 for controlling the current distribution. For example, a plurality of connection ports 600 may be placed at different azimuths, which may control the azimuthal distribution of current and may optimize the current mitigation at a receiver (not illustrated). Gap sub 200 may comprise of an annulus (not illustrated) that may allow drilling fluids to pass through. Connection ports 600 and voltage source 400 may be disposed in such a way that each one minimally impedes the flow of drilling fluid. For example, connection ports 600 or voltage source 400 may be disposed on an inner wall of gap sub 200 and may be disposed within an insert comprising a smooth surface to minimize fluid flow disturbance. Additionally, connection ports 600 or voltage source 400 may be disposed within gap sub 200 in such a manner that connection ports 600 or voltage source 400 may not extrude from the inner or outer diameter of gap sub 200. Further, connection ports 600 or voltage source 400 may be disposed on the outer surface of gap sub 200.

Figure 7:
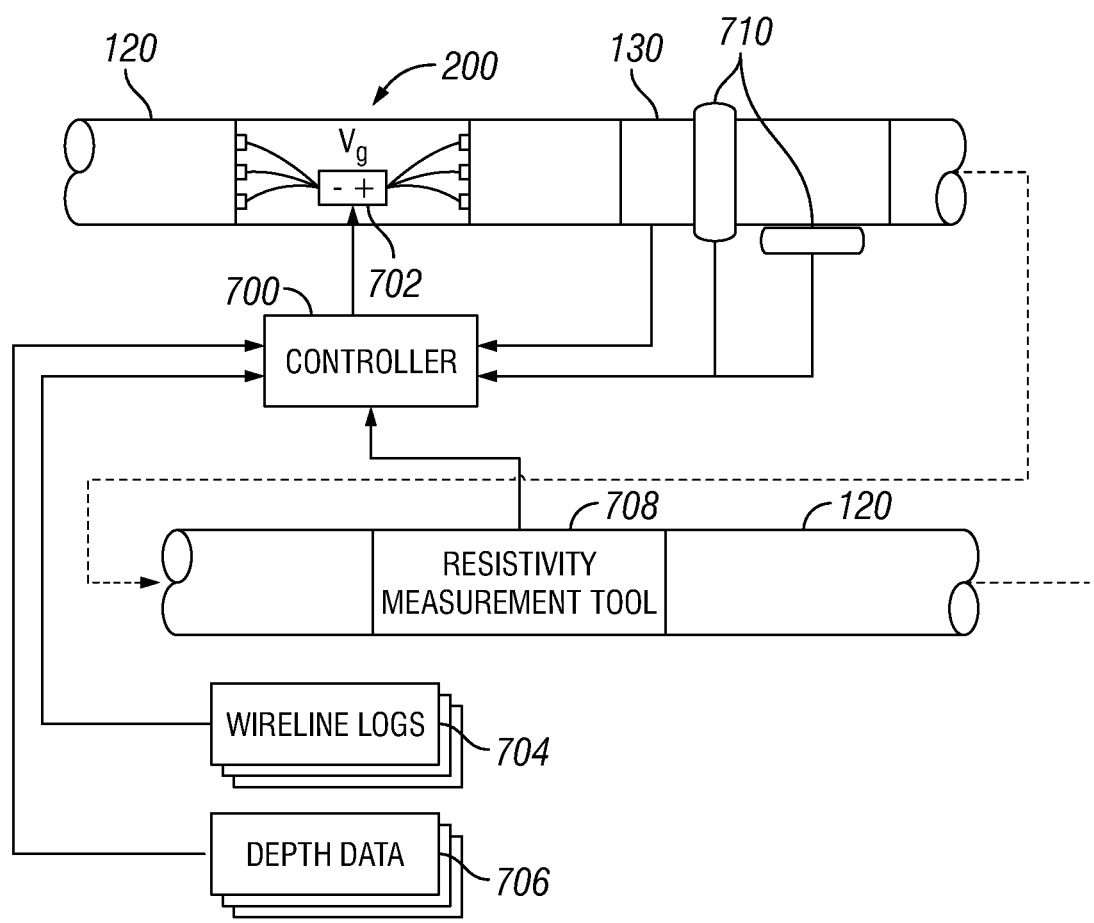
FIG. 7 is a schematic illustration of an example of a conductive body 120 with a controller.

FIG. 7 illustrates another example of gap sub 200 disposed on conductive body 120. A controller 700, which may be disposed within gap sub 200 and/or within conductive body 120, may program voltage $V_g$ with pre-stored data. Specifically, controller 700 may control magnetic voltage source 702, which may increase and/or decrease voltage $V_g$. In examples, controller 700 may be attached to information handling system 124 and/or downhole information handling system 126 (e.g., FIG. 1). This may allow controller 700 to dynamically control the voltage within gap sub 200, which may be based on inputs received by controller 700. For example, without limitation, inputs may comprise data from wireline logs 704, depth data 706, a resistivity measurement tool 708, one or more toroidal coils 710, and/or a receiver 130. Data and/or information from these inputs may be processed by information handling system 124 and/or downhole information handling system 126, which may alter the voltage within gap sub 200 dynamically an in real time. It should be noted that gap sub 200 may be operated statically in some examples.

In examples, not illustrated, there may be a current source instead of the voltage source 400 inside gap sub 200 that may maintains a gap current Ig at connection ports 600. In an example, the voltage Vg and/or current Ig may be proceed by information handling system 124 and/or downhole information handling system 126 through numerical modeling and/or analytical computation. Using mathematical models representative of conductive body 120 and formation 106, Vg (or Ig) may be adjusted to give a null (or sufficiently small) current near receiver 130. With oil-based mud (R=1000 ohm), Vg (or Ig) may be fairly independent of formation 106 resistivity. Thus, controller 700 may not incorporate additional inputs. FIG. 7 is an example scenario where gap current Ig may be fixed at 46 mA, and formation resistivity Rf may be either 1 ohm, 20 ohms, or 100 ohms. This particular gap current may be optimal for Rf=20 ohms, but the shift in the current null may not be severe for 1 ohm and/or 100 ohms. If such error may be acceptable in certain operation, statically fixing Vg (or Ig) in this manner may be a viable option. If the optimum Vg (or Ig) varies substantially with formation resistivity, as is the case with water-based mud (WBM), Vg (or Ig) may be pre-calibrated to a set of formation resistivities using the same models and/or analytical formulas mentioned above. The formation resistivity at various depths may be obtained through independent wireline logging, and/or permanent monitoring measurements, and fed to controller 700 through an input in controller 700. Using external information at each depth, Vg (or Ig) may be set to the proper value using the pre-stored calibration lookup table. The depth information may be obtained through various means (MWD, telemetry, drill string length, wireline length, known casing depth, etc.) and sent to controller 700 through an input.

In examples, Vg (or Ig) may be pre-calibrated for a set of formation resistivities by building lumped circuit models in a laboratory and adjusting Vg (or Ig) to minimize receiver voltage for these formation resistivities. This method may have the advantage of removing the need to model receiver 130 in detail. Controller 700 may receive formation resistivity and depth information through an input.

In examples, Vg (or Ig) may be determined in real time in a downhole environment without pre-stored calibration lookup tables. Conductive body current and/or the leakage current may be measured at receiver 130 by toroidal coils 710 wrapped around conductive body 120 and/or placed on its side with radial orientation. Controller 700 may monitor one and/or more of these currents and adjusts Vg (or Ig) until Vg (or Ig) may be minimized. Toroidal coils 710 may wrap around conductive body 120 and/or receiver 130. Toroidal coils 710 may not be disposed at receiver 130, which may be an ideal position. Even if one or more toroidal coils 710 may be disposed away from receiver 130, the current from receiver 130 may be inferred from modeling within information handling system 124 and/or downhole information handling system 126. In examples in which a plurality of toroidal coils 710 may be employed, the current from receiver 130 may be inferred by extrapolating measurements from toroidal coils 710 to where receiver 130 may be disposed.

Without limitation, Vg (or Ig) may be determined in real time in the downhole environment without pre-stored calibration lookup tables in the following example. Voltage from receiver 130 may be measured at various azimuthal orientations of conductive body 120, by placing multiple receivers 130 azimuthally, and/or rotating receiver 130, and/or rotating conductive body 120. A signal from a target well may have a sinusoidal and/or double-sinusoidal pattern with respect to the azimuth. In contrast, a direct signal from a transmitter, not illustrated, disposed on conductive body 120 may be nearly constant because of the azimuthal symmetry of the current from conductive body 120. The direct signal may therefore be the average of the total signal over the rotation angle. The gap voltage Vg and/or current Ig may then be adjusted to give the smallest rotational average for the total signal. Controller 700 may process the receiver signal through an input and may utilize information handling system 124 and downhole information handling system 126.

Gap sub 200 may also be used for other purposes. In one embodiment, the voltage (or current) source in gap sub 200 may be used as a second excitation source for obtaining extra information on a target location, not illustrated, for example a target location may be, but is not limited to, a formation, bed boundary, second well, waterflood, etc. This extra information may be useful to reduce ambiguity in inversion algorithms that compute target parameters from receiver measurements. In another embodiment, the second excitation source within gap sub 200 may be adjusted to optimize a scattered target signal profile over conductive body 120. Each source of excitation on conductive body 120 induces a separate scattered target signal profile on conductive body 120, which may be exploited to maximize a target signal at receiver 130.

In another embodiment, referring to FIG. 2, the second excitation source within gap sub 200 maybe used for at-bit resistivity measurement. At-bit resistivity measurement may be defined as the formation resistivity near the close vicinity of drill bit 118. It may be measured using a toroidal coil 710 and/or galvanic current source near drill bit 118 if oil-based mud may be used. Oil based mud may be critical to force current to flow through conductive body 120 and into formation 106 via drill bit 118. At-bit resistivity may be obtained from voltage Vg and current Ig over gap sub 200. A multiplicative factor between gap sub impedance Zg and at-bit resistivity (Rf,AB) may be found from a priori numerical modeling.

Figure 8:
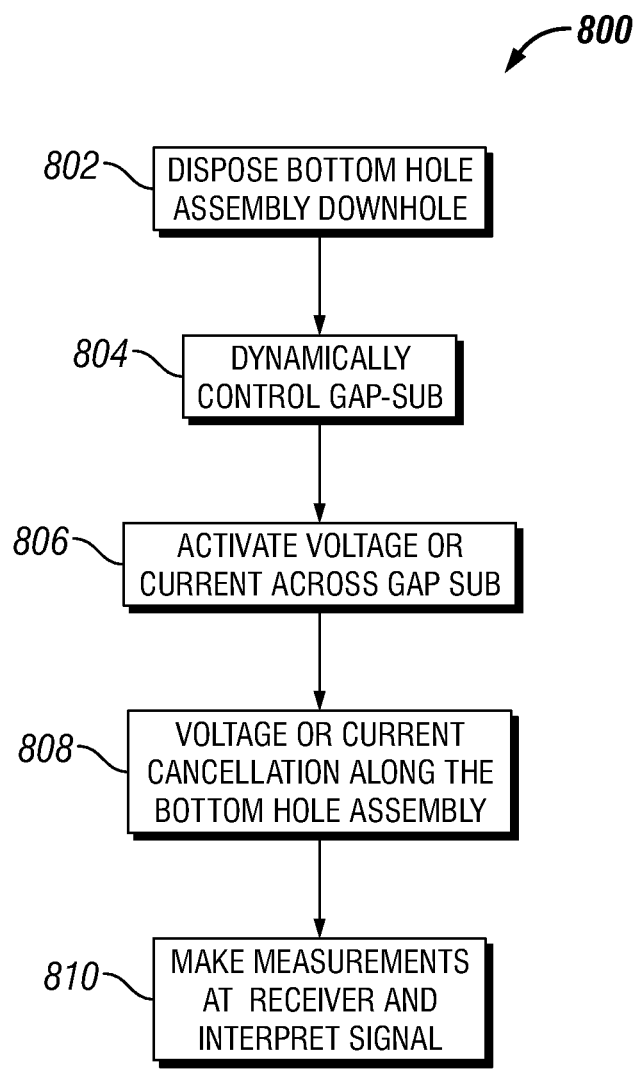
FIG. 8 illustrates a flow chart for cancelling current along a conductive body 120.

FIG. 8 illustrates a flow chart for a method 800 of cancelling and controlling current through a conductive body 120. In block 802, conductive body 120 may be disposed downhole in preparation for operations. In examples, conductive body 120 may be connected to information handling system 124 before and/or after being disposed downhole. Block 804 represents dynamic control of gap sub 200. Dynamic control of gap sub 200 may comprise controlling gap voltage and/or current using depth information, resistivity information, conductive body current near receiver 130, and/or information from a recorded signal. With gap sub 200 set-up for operation, in block 806 the voltage and/or current is activated across gap sub 200. During operation, in block 808, the voltage and current across gap sub 200 may be cancelled along the conductive body 120 during operations, which may allow an operator to perform different function across conductive body 120. For example, operations may include, but are not limited to, secondary excitation to obtain independent measurement, secondary excitation to maximize received signal level, shift cancellation of current to the receiver location, and/or secondary excitation to measure at-bit resistivity.

Figure 9:
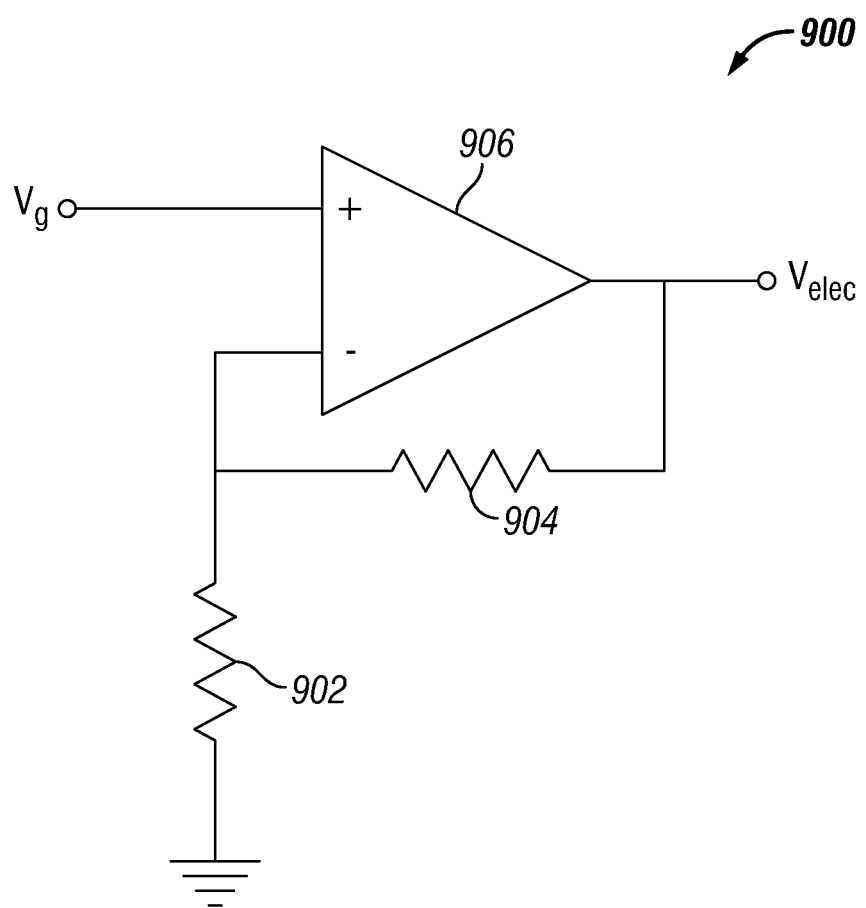
FIG. 9 is a schematic illustration of a non-inverting amplifier to set the gap voltage as a multiple or fraction of the receiver voltage.

The methods in this disclosure may be applied at zero frequency, i.e., direct-current (DC) operation. Electromagnetic sensor system 100, however, often operates at very low frequencies (e.g. 1-100 Hz). The methods in this disclosure may be applied at an arbitrary frequency, provided that the gap voltage and the receiver voltage may be suitably synchronized. This may be achieved by using a voltage divider (non-inverting amplifier) set the gap voltage using the receiver voltage. A circuit 900 is illustrated in FIG. 9, circuit 900 may comprise resistors 902 and 904, whose values may change depending on the formation resistivity. Circuit 900 may further comprise amplifier 906, which may be operate as a non-inverting amplifier to set the gap voltage as a multiple or a fraction of the receiver voltage. This method may ensure proper synchronization between the receiver voltage and the gap voltage. The receiver and gap voltages in the FIG. 9 may be swapped, as the latter may need to be larger than the former.

Gap subs 200 may be used extensively in wireline, LWD, and telemetry applications. Gap subs 200 may minimize and/or eliminate electrical contact between two portions of conductive body 120. Additionally, gap subs 200 may cancel current at the location of the gap sub 200 and control current cancellation on conductive body 120 through active excitation of gap sub 200. The present disclosure describes methods for shifting current cancellation from gap sub 200 to receiver 130, which may not be collocated with gap sub 200. In examples, gap sub 200 may be considered an "active" gap sub and utilized as a secondary excitation source that may give additional independent measurements for an inversion algorithm. As a secondary source, it may also be used to maximize the target signal on receiver 130. It may also be used to gather at bit resistivity information.

This systems and methods may include any of the various features of the compositions, methods, and system disclosed herein, including one or more of the following statements.

Statement 1: A method of mitigating direct coupling comprising: disposing an electromagnetic sensor system in a wellbore, wherein the electromagnetic sensor system comprises a receiver disposed on a conductive body and a gap sub disposed at another location on the conductive body; exciting an electromagnetic source to inject an electrical current into a formation; exciting the gap sub to achieve a small current condition at the selected point; performing a first measurement at a receiver; interpreting the first measurement to calculate a formation or pipe parameter; and using the formation or pipe parameter to adjust at least one parameter of a well operation.

Statement 2: The method of statement 1, further comprising disposing the gap sub substantially close to the receiver.

Statement 3: The method of statement 2 or statement 1, further comprising dynamically adjusting a voltage or current source to achieve the small current condition.

Statement 4: The method of any preceding statement, wherein a voltage divider is configured to achieve current cancellation.

Statement 5: The method of any preceding statement, further comprising performing a second measurement, wherein the first measurement and the second measurement are at different times or different frequencies, and wherein the first measurement and second measurement are performed by a first set of source and gap sub currents or a second set of source and gap sub currents, wherein the first set of source and gap sub currents and the second set of source and gap sub currents are linearly independent, and the first measurement and the second measurement are combined into combined measurements to achieve the small current condition.

Statement 6: The method of any preceding statement, wherein the first measurement and second measurement are used in the interpretation.

Statement 7: The method of any preceding statement, wherein the interpreting the first measurement to calculate a formation or pipe parameter comprises using the combined measurements.

Statement 8: The method of any preceding statement, determining proximity to the small current condition with measurements at one or more points of the conductive body, and using the proximity information to dynamically adjust the gap sub.

Statement 9: The method of any preceding statement, wherein the determining proximity to the small current condition with uses a toroid.

Statement 10: The method of any preceding statement, calculating proximity to the small current condition with lumped modeled currents.

Statement 11: The method of any preceding statement, wherein the selected point is at the position of the receiver.

Statement 12: The method of any preceding statement, wherein resistivity is measured and used in calculation of the modeled currents.

Statement 13: The method of any preceding statement, wherein the receiver is azimuthally disposed along the conductive body.

Statement 14: The method of any preceding statement, further comprising rotating the receiver.

Statement 15: The method of any preceding statement, further comprising measuring, with the gap sub, a resistivity at a bit disposed on a drill string.

Statement 16: A system of mitigating direct coupling comprising; a conductive body comprising; a gap sub; a controller, wherein the controller controls a voltage or a current across the gap sub; a voltage source, wherein the voltage source is attached to a connection port; a receiver; and an information handling system, wherein the information handling system is operable to cancel current at a location on the conductive body.

Statement 17: The system of statement 16, wherein the controller dynamically controls the voltage or the current across the gap sub from an input.

Statement 18: The system of statement 17 or statement 16, wherein the input comprises depth information, resistivity information, conductive body current near the receiver, or information from a recorded signal.

Statement 19: The system of any preceding statement, wherein the information handling system is operable to operate a secondary excitation to obtain an independent measurement, to maximize received signal level, to shift cancellation of current to location of the receiver, or to measure at-bit resistivity.

Statement 20: The system of any preceding statement, wherein the information handling system is operable to record signals at the receiver and make measurements from the recorded signals.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method of mitigating direct coupling comprising:
    disposing an electromagnetic sensor system in a wellbore, wherein the electromagnetic sensor system comprises a receiver disposed on a conductive body and a gap sub disposed at another location on the conductive body;
    exciting an electromagnetic source to inject a current into a formation;
    exciting a voltage source or a current source in the gap sub to mitigate direct coupling of the current from the electromagnetic source to the receiver;

measuring the current on the conductive body; and
adjusting the voltage source based at least in part to the current.

2. The method of claim 1, further comprising disposing the gap sub substantially close to the receiver.

3. The method of claim 1, further comprising dynamically adjusting the voltage source or the current source to achieve a small current condition.

4. The method of claim 3, wherein a voltage divider is configured to achieve current cancelation.

5. The method of claim 1, further comprising taking a second measurement, wherein the second measurement is at a second times or a second different frequency.

6. The method of claim 5, further comprising interpreting the measurement and the second measurement to calculate a formation property.

7. The method of claim 1, further comprising identifying a location of a small current on the conductive body and adjusting the voltage source or the current source based at least in part on the small current condition.

8. The method of claim 7, wherein the location of the small current condition is identified with a toroid.

9. The method of claim 1, further comprising calculating a location of a small current condition with lumped circuit models.

10. The method of claim 1, further comprising measuring the current at the receiver.

11. The method of claim 1, further comprising determining a formation resistivity from the current.

12. The method of claim 1, wherein the receiver is azimuthally disposed along the conductive body.

13. The method of claim 1, further comprising determining at-bit resistivity from the current and a voltage at the gap sub.

14. A system of mitigating direct coupling comprising;
   a conductive body comprising;
      a gap sub disposed on the conductive body;
      a controller, disposed in the gap sub;
      a receiver disposed on the conductive body; and
      a voltage source, wherein the voltage source is attached to the conductive body by one or more connection ports, and where the voltage source is connected to and controlled by the controller to mitigate direct coupling at the receiver; and
   an information handling system connected to the controller, wherein the information handling system is configured to operate the controller to mitigate direct coupling along the conductive body.

15. The system of claim 14, wherein the controller dynamically controls a voltage or a current across the gap sub based at least in part on one or more inputs.

16. The system of claim 15, wherein the one or more inputs include depth information, resistivity information, conductive body current near the receiver, or information from a recorded signal.

17. The system of claim 14, wherein the information handling system is configured to operate a secondary excitation to obtain an independent measurement, to maximize received signal level, to shift cancellation of current to location of the receiver, or to measure at-bit resistivity.

18. The system of claim 14, wherein the information handling system is configured to record one or more signals measured at the receiver.

* * * * *